United States Patent [19]

Okuyama et al.

[11] Patent Number: 4,558,897

[45] Date of Patent: Dec. 17, 1985

[54] MOVABLE TYPE AIR BALANCE PANEL

[75] Inventors: Teiji Okuyama; Kazutaka Kuwana, both of Toyota; Masanobu Ishikawa, Nagoya, all of Japan

[73] Assignee: Aisin Seiki Kabushiki Kaisha, Kariya, Japan

[21] Appl. No.: 404,658

[22] Filed: Aug. 3, 1982

[30] Foreign Application Priority Data

Aug. 5, 1981 [JP] Japan ................................ 56-121869
Aug. 5, 1981 [JP] Japan ................................ 56-121870

[51] Int. Cl.4 ............................................ B62D 37/02
[52] U.S. Cl. ...................................... 296/1 S; 180/903
[58] Field of Search ............... 296/1 S, 91; 244/76 B, 244/203, 214; 180/175–177, 903

[56] References Cited

U.S. PATENT DOCUMENTS 2,448,167  8/1948  Baak ..................................... 244/203
3,455,594  7/1979  Hall et al. ............................. 296/1 S
4,102,548  7/1978  Kangas ................................. 296/1 S
4,105,088  8/1978  Levijoki ............................... 180/177
4,119,339  10/1978 Heimburger ......................... 180/903
4,131,308  12/1978 Holka et al. ......................... 296/1 S
4,159,140  6/1979  Chabot et al. ....................... 296/1 S
4,232,757  11/1980 Ochiai et al. ........................ 180/176
4,457,558  7/1984  Ishikawa .............................. 296/1 S Primary Examiner—Robert B. Reeves
Assistant Examiner—Dennis H. Pedder
Attorney, Agent, or Firm—Oblon, Fisher, Spivak, McClelland & Maier

[57] ABSTRACT

A movable type air balance panel is mounted beneath the front end of a motor vehicle. This balance panel moves upward and downward in response to the speed of the vehicle and is maintained in a retracted position when the brakes are applied, thereby decreasing the chance of damage to the balance panel. Air resistance is decreased during low speed operation of the vehicle.

17 Claims, 6 Drawing Figures

MOVABLE TYPE AIR BALANCE PANEL

BACKGROUND OF THE INVENTION

1. Field of the Invention

This invention relates to a movable type air balance panel which is movably mounted on a vehicle body in order to improve the aeromechanic or aerodynamic characteristics of the vehicle, and more particularly to a front air balance panel of a movable type which is adapted to be mounted beneath the front end of a vehicle underbody.

2. Description of Prior Art

It is known that a aeromechanic characteristics of the vehicle can be improved by means of mounting a balance panel beneath the front end of the vehicle underbody. Therefore, stationary type air balance panels have been proposed which are mainly incorporated into the vehicle body. However, such air balance panel works effectively only when the speed of the vehicle exceeds a predetermined velocity, and on a low speed drive of the vehicle such as occurs on a bad road there is a possibility that obstacles will cause damage to the air balance panel. Furthermore, on the low speed drive on the vehicle, no operation of the air balance panel will be required. The operation of the panel causes a problem in that the resistance of the air is increased on the vehicle.

SUMMARY OF THE INVENTION

Accordingly, it is an object of the present invention to eliminate the disadvantages of prior art balance panels mentioned above.

It is another object of the present invention to provide a movable type air balance panel which moves in an upward and downward direction in response to the speeds of the vehicle.

It is a further object of the present invention to provide a movable type air balance panel which is maintained in a retracted position when the brakes of the vehicle are applied.

It is still another object of the present invention to provide a movable type air balance panel which operates with hysteresis.

BRIEF DESCRIPTION OF THE DRAWINGS

Other objects, features and advantages of the present invention will become apparent from the succeeding detailed description of preferred embodiments with reference to the accompanying drawings wherein.

DETAILED DESCRIPTION OF THE PREFERRED EMBODIMENTS

Figure 1:
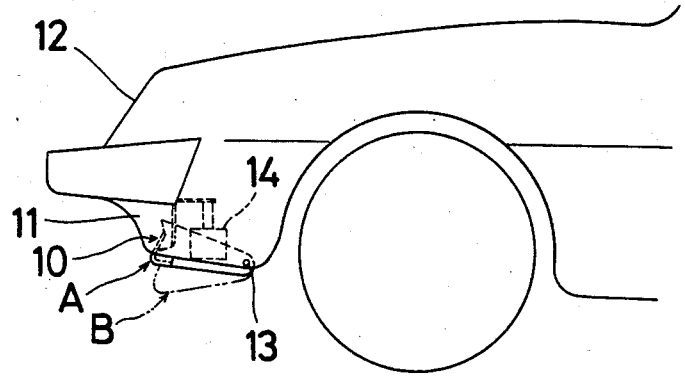
FIG. 1 is a diagrammatic view showing an install condition of an air balance panel embodiyng the present invention, the air balance panel being shown mounted beneath the front end of a vehicle.
Figure 2:
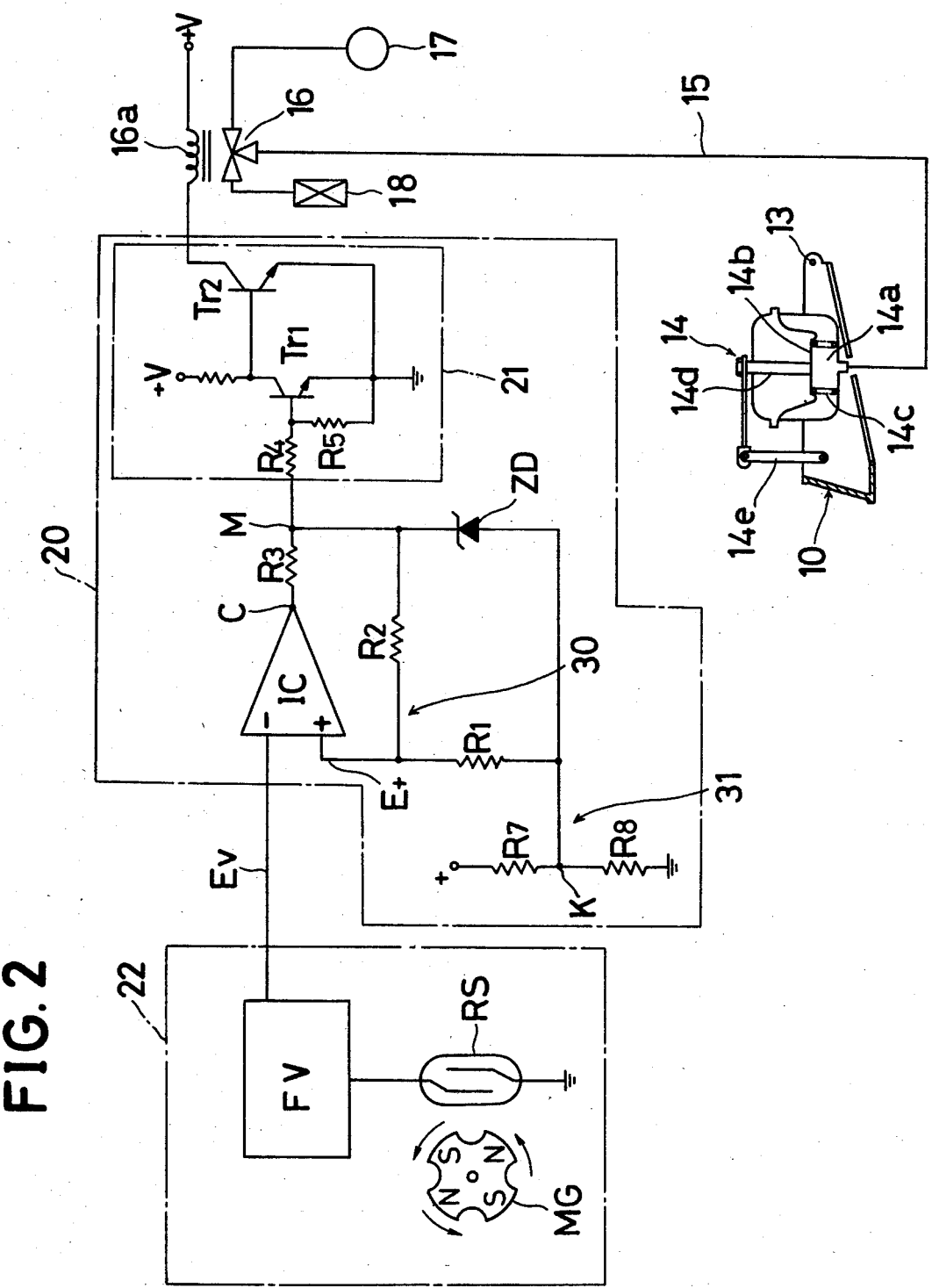
FIG. 2 is a view showing an electric control circuit to cause the air balance panel of FIG. 1 to operate.

Referring now to FIG. 1, there is shown an air balance panel, generally designated at 10, mounted beneath a front end 11 of a vehicle body 12. A front surface of the balance panel 10 can move upward and downward about a pin 13 in response to operations of an actuator 14. More particularly, the balance panel 10 can move between the retracted position shown by the reference A and the operative position shown by the reference B. As shown in FIG. 2, the actuator 14 includes a chamber 14a defined by a diaphragm 14b which is biased by a spring 14c positioned within the chamber 14a. The chamber 14a is connected by means of a conduit 15 to a solenoid valve 16 as switching means which selectively completes the communication between the chamber 14a and an engine intake manifold, and the communication between the chamber 14a and the atmosphere by way of filter 18. The diaphragm 14b is connected with the balance panel 10 by means of a rod 14d and a link mechanism 14e. In the presence of vacuum pressure in the chamber 14a, that is to say, when the solenoid valve 16 completes the communication between the chamber 14a and the intake manifold 17, the diaphragm 14b is moved downwardly by the vaccum pressure, whereby the balance panel 10 is moved downwardly as shown by the reference B in FIG. 1. On the other hand, in the presence of atmosphere in the chamber 14a, that is, when the solenoid valve 16 completes the communication between the atmosphere and the chamber 14a, the diaphragm 14b is lifted upwardly by the biasing force of the spring 14c, whereby the balance panel 10 is moved upwardly as shown by the reference A in FIG. 1.

An electric control circuit 20 shown in FIG. 2 comprises basically a comparison circuit IC which includes a first or inversion input terminal ($-$) and a second or non-inversion input terminal ($+$) and further an output terminal C transmitting an output signal according to a result of comparison of the input signals at the above both input terminals, a feedback circuit 30 which returns the output to the second input terminal, and a supply circuit 31 which supples a contstant voltage, as an electric signal corresponding to a predetermined speed of the vehicle, to the second input terminal. The output terminal C is connected with a driving circuit 21 which excites a solenoid coil 16a of the solenoid valve 16.

The first input terminal of the comparison circuit IC is connected with an output terminal of a speed responsive signal generating means 22 which converts a pulse signal which is detected by a speed detecting reed switch RS, into a voltage signal Ev by means of a FV converter. The reed switch RS is ON-OFF operated by the rotation of a magnet MG which rotates in response to the rotation of a drive shaft and then transmits a pulse frequency signal, which responds to the actual speed of the vehicle, to the FV converter. It may be possible to use any well-known generating means as the speed responsive signal generating means 22. Since the means 22 is out of a main point of this invention, the detailed explanation of the means 22 may be omitted here.

The second input terminal of the comparison circuit IC is connected through means of a resistance $R_1$ to a dividing terminal K which divides an interval between a constant voltage power souce $+V$ and an earth through means of a resistance $R_7$ and a resistance $R_8$, respectively. That is to say, a constant voltage $V_K$ is supplied from the dividing terminal K to the second input terminal of the circuit IC as an electric signal corresponding to a predetermined speed of the vehicle.

The output terminal C of the comparison circuit IC is connected through means of a resistance $R_3$ to a terminal M which acts as an output terminal to the driving circuit 21. The terminal M is connected through means of a resistance $R_2$ to the second input terminal of the comparison circuit IC, and at the same time is connected through means of a zener diode ZD to the resistance dividing terminal K, the latter being parallel to the circuit having a resistance $R_1$ and the resistance $R_2$.

The terminal M is connected through means of a resistance $R_4$ to the base terminal of a transistor $Tr_1$. The base terminal is connected through means of a resistance $R_5$ to ground. The emitter terminal of the transistor $Tr_1$ is grounded. On the other hand, the collector terminal of the transistor $Tr_1$ is connected through means of a resistance $R_6$ to a constant voltage power source $+V$, and at the same time is connected to the base terminal of a transistor $Tr_2$. The emitter terminal of the transistor $Tr_2$ is grounded. The collector terminal of the transistor $Tr_2$ is connected to a constant voltage power source $+V$ through means of the solenoid 16a of the solenoid valve 16.

The solenoid valve 16 is applied as a switching means to cause the actuator 14 to operate in the embodiment shown in FIG. 2. The solenoid valve 16 connects the conduit 15 with the intake manifold when the solenoid 16a is excited, and connects the conduit 15 with the atmosphere through the filter 18 when the solenoid 16a is not excited.

In operation, the second input terminal (+) of the comparison circuit IC is provided with the voltage $E+$ corresponding to a speed of 70 km/h from the dividing terminal K through means of the resistance $R_1$. On the other hand, the first input terminal (−) is provided with the speed responsive voltage signal Ev which changes in response to the actual speed of the vehicle. When the actual speed of the vehicle is less than the predetermined velocity 70 km/h, the terminal M is provided with a voltage $V_M$ transmitted through the resistor $R_3$ from the output voltage $V_c$ of the comparison circuit IC corresponding to the output of the comparison circuit IC. The above voltage $V_M$ is in a high level. The transistor $Tr_1$ is maintained in an electric conductive condition and the transistor $Tr_2$ is maintained in an electric nonconductive condition, the solenoid 16a will be not charged electrically, wherein the solenoid valve 16 connects the filter 18 with the conduit 15. Therefore, the actuator 14 is maintained in the retracted position, that is, the diaphragm 14b is kept in the upward position by the biasing force of the spring 14c. Accordingly, the air balance panel is moved upwardly and then is retracted into the vehicle body 12.

Next, when the actual speed of the vehicle rises beyond the predetermined velocity, the voltage signal Ev becomes greater than the voltage signal $E+$. As the result, the voltage $V_M$ of the terminal M is maintained in a low level according to the output signal of the comparison circuit IC. Since the transistor $Tr_1$ is maintained in a nonconductive condition and the transistor $Tr_2$ is maintained in a conductive condition, the solenoid 16a will be charged electrically, wherein the solenoid valve 16 connects the intake manifold 17 with the conduit 15. Therefore, the diaphragm 14b is attracted downwardly by the vacuum force within the chamber 14a which now is in communication with the intake manifold 17. Accordingly, the air balance panel is moved downwardly and then is kept in the operative position.

Figure 3:
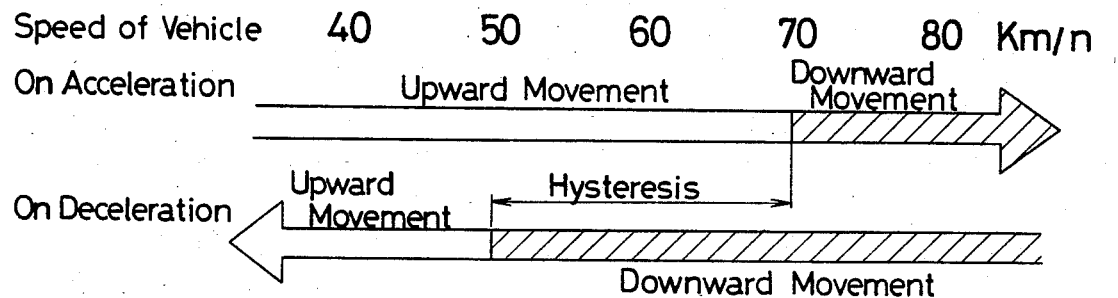
FIG. 3 is an explanation view showing a working pattern of the air balance panel of FIG. 1.
Figure 4:
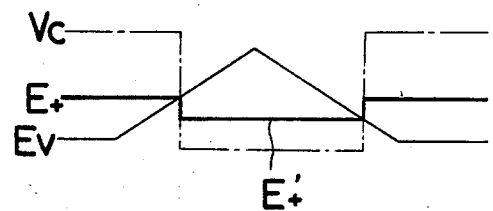
FIG. 4 is a view showing an input-output pattern of a comparison circuit used in the electric control circuit of FIG. 2.

At this time, since the output terminal C is connected through means of the resistance $R_3$ and the resistance $R_2$ the second input terminal of the comparison circuit IC owing to the low level voltage $V_c$ generated at the output terminal C, the voltage $E+$ at the first input terminal of the comparison circuit IC drops from the initial voltage $E+$ to a lower voltage $E+'$ which shows a voltage corresponding to, for example, a speed of 50 km/h as shown in FIG. 4. As the result, as shown in FIG. 3, while the voltage Ev is higher than the voltage $E+'$ ($Ev>E+'$) during decelerations, the air balance panel 10 is maintained in the operative position. On the other hand, while the voltage Ev is lower than the voltage $E+'$ ($Ev<E+'$), the output of the comparison circuit IC changes into the high level. Therefore, the transistor $Tr_1$ is maintained in the conductive condition and the transistor $Tr_2$ is maintained in the nonconductive condition, and then the solenoid 16a will be not charged electrically, wherein the solenoid valve 16 connects the air filter 18 with conduit 15. Accordingly, the air balance panel 10 moves upwardly in response to the upward movement of the diaphragm 14b of the actuator 14. At the same time, the input voltage of the comparison circuit IC returns from the voltage $E+'$ to the initial voltage $E+$ ($E+>E+'$).

Figure 6:
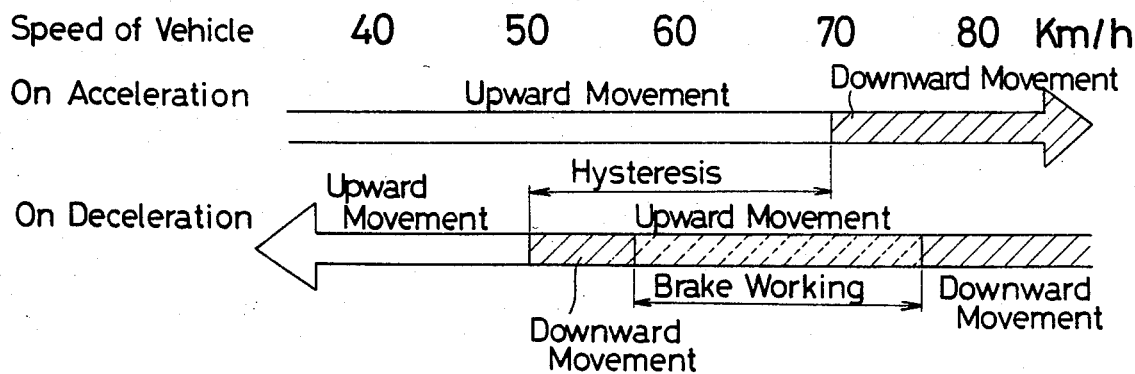
FIG. 6 is a view similar to FIG. 3, but showing another embodiment of the present invention, using the electric control circuit of FIG. 5.

The hysteresis of the output voltage Vc in accordance with the increasing or decreasing of the speed responsive voltage signal Ev, or the speed of the vehicle is shown in FIGS. 3 and 6. The voltage $E+$ of the terminal (+) of the comparison circuit IC is approximately determined by the sum of $$\left(\frac{R_8}{R_7+R_8}V+\right) \text{ and } \left(\frac{R_1}{R_1+R_2}V_{ZD}\right).$$

The output voltage Vc is at a high level when the speed responsive voltage signal Ev is below the voltage $E+$ so that the zener diode voltage $V_{ZD}$ is at a predetermined valve. However, the value of the zener diode voltage $V_{ZD}$ is zero, since the output voltage Vc is at a low level when the speed responsive voltage signal Ev is greater than the Voltage $E+$. Therefore, the voltage $E+$ has high value $$\left(\frac{R_8}{R_7+R_8}V+ +\frac{R_1}{R_1+R_2}\right)V_{ZD}\right)$$

is shown in FIG. 4.

First, at a low speed, the speed responsive voltage signal Ev is lower than the voltage Vc is in the low level state and the voltage $E+$ has a high value. When according to the increase of the speed of the vehicle, the speed responsive voltage signal Ev goes beyond the high value of the voltage $E+$, the output voltage Vc change from a high level to low level. Also, the voltage changes from the high value to the low value $$\left(\frac{R_8}{R_7+R_8}V+\right).$$

Further, as the transister $Tr_1$ is switched off and thr transister $Tr_2$ is switched on, the actuator 14 is supplied with a vacuum from the intake manifold 17 through the solenoid valve 16 and the panel 10 is moved towards the low position by the operation of the actuator 14.

After that, even though the speed diminishes, the panel 10 is continuously positioned at the low position as long as the speed rresponsive voltage signal Ev is below the voltage E+ in the low value state. When the speed decreases further and the speed responsive voltage signal Ev goes below the low value of the voltage E+ the output voltage Vc is changed to the high level and the voltage E+ is changed in the high value state. Thus, as the transister $Tr_1$ is switched on and the transistor $Tr_2$ is switched off, the solenoid valve 16 is changed so that the actuator 14 communicates with the atmosphere through the solenoid valve 16 and the air filter 18. The panel 10 then moves towards the upper position.

As described above, the voltage V+ is changed in between of the low value state and the high value state in accordance with the change of the speed as shown in FIG. 4. Accordingly, the hysteresis of the output Vc, which controls the panel 10, in accordance with the increasing or decreasing of the speed is caused.

In the above-mentioned embodiment of the present invention, a vacuum pressure type actuator is adopted as an actuator. It is possible, however, to utilize another well-known actuator such as an oil pressure type and an electric-powered type. The operative relation between the switching of the solenoid valve 16 and the electric charge of the solenoid 16a is selected in accordance with the operative method of the actuator and with the configuration of the link mechanism 14e.

The configuration of the present invention also is not limited to this embodiment. An inversion circuit and/or an amplification circuit can be used according to the need.

In the circuit forming a hysteresis, it may be possible to adopt another well-known output feedback type means which drops the standard voltage of the noninversion input terminal in the comparison circuit IC.

The width of the hysteresis can be changed by the selection and the combination of the resistances. The chattering can be prevented by forming a width in a differential detecting sensitivity of the comparison circuit IC.

As the speed responsive signal generating means 22, a well-known means is properly used. It may be used a means, which is installed for controlling an automatic transmission, to serve a double purpose.

As previously indicated, the electric circuits are used in the above-mentioned embodiment as control circuits. The operation of the present invention can be also attained by oil pressure circuits using oil pressure signals and the comparison circuit thereof. The operation of the hysteresis can be also attained by providing a feedback circuit returning the output of the comparison circuit, in the same manner as the electric circuits. In this case, orifice means, valve means, a booster or an actuator are used, corresponding to electric means elements such as resistances, inversions, amplifications, etc.

Figure 5:
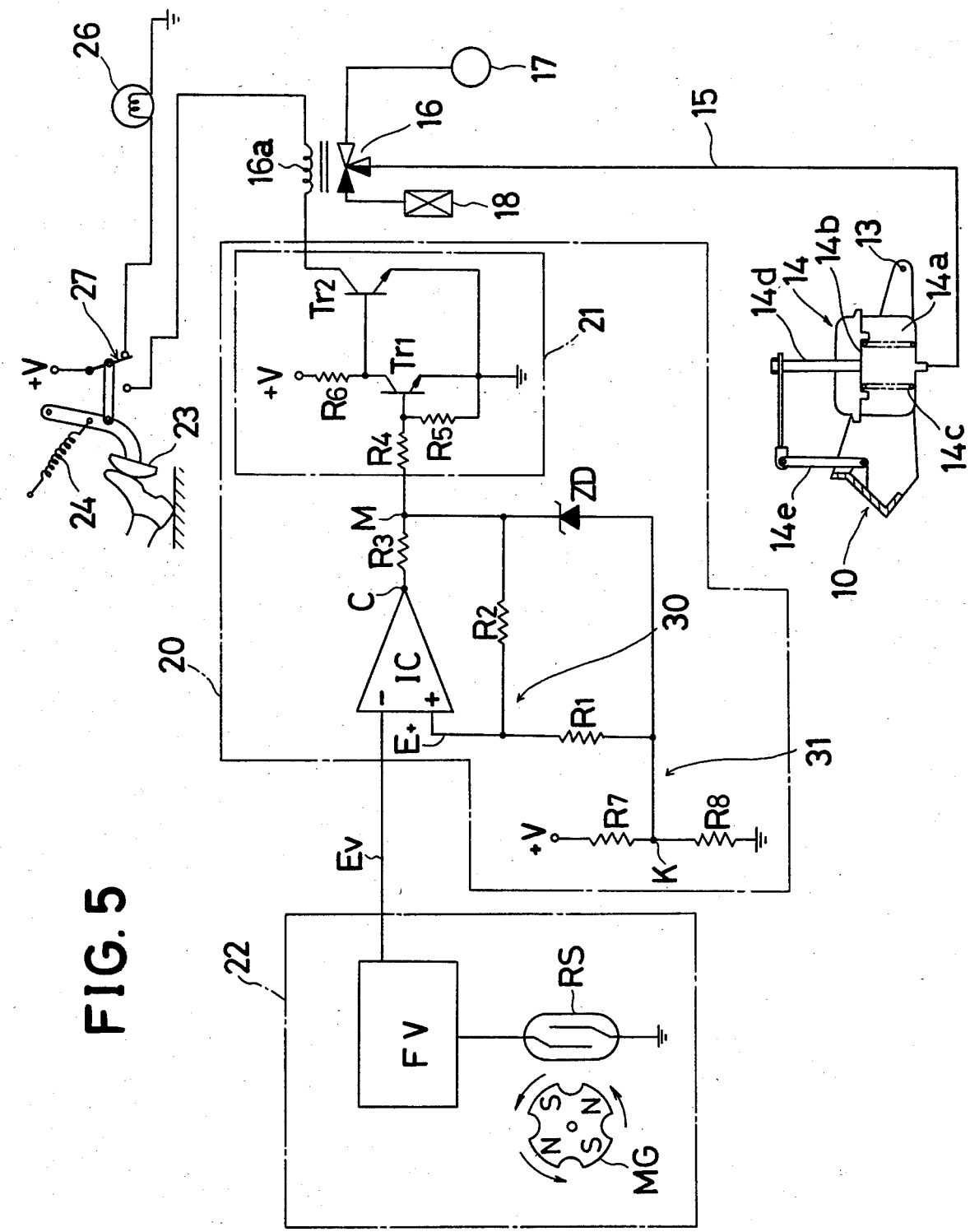
FIG. 5 is a view similar to FIG. 2, but showing another embodiment of the present invention.

From the above, it will be seen that according to the present invention the air balance panel can move upwardly and downwardly in response to the speeds of the vehicle, and that the air balance panel can be operated only during a high velocity, that is to say, only when it is necessary to operate the balance panel. Therefore, the damages of the air balance panel can be decreased and at the same time the air resistance can be decreased during a low speed of the vehicle. Referring now to FIG. 5 showing another embodiment of the present invention, the parts which are substantially the same as those of the prevίous embodiment will be illustrated by the same reference numerals and, therefore, the detailed explanation thereof will be omitted. The circuit shown in FIG. 5 is essentially equal to the circuit shown in FIG. 2 except for the brake interlocking switch 27 provided between the voltage V+ and the solenoid 16a in FIG. 5. So, the circuit shown in FIG. 5 forms the hysteresis in the same manner as the circuit shown in FIG. 2. In FIG. 5, the collector terminal of the transistor $Tr_1$ is connected to a constant voltage power source +V by means of the solenoid 16a of the solenoid valve 16 and a brake interlocking switch 27 connected in series with the solenoid 16a.

The brake interlocking switch 27 operates in association with a brake pedal 23, and is maintained in the OFF position when the brake pedal 23 is depressed by a driver. When the brake pedal 23 is not depressed, the brake interlocking switch 27 is switched by a biasing force of a spring 24 thereby completing electric connection between the constant voltage power source +V and the solenoid 16a.

In operation, the solenoid 16a of the solenoid valve 16 acting as a switching means is connected by means of the brake interlocking switch 27 to the constant voltage power source, as shown in FIG. 5. Therefore, the solenoid valve is not charged electrically when the brake pedal 23 is depressed. As the result, in spite of the conditions of the output signal of the control circuit 20, the solenoid valve 16 will be in the noncharge position as long as the brake pedal 23 is depressed. Accordingly, since the chamber 14a of the actuator 14 is connected through the conduit 15 to the air filter 18 which is in communication with the atmosphere, the air balance panel 10 is moved upwardly and then is retracted into the vehicle body 12. This operation is made in spite of the height of the actual speed of the vehicle. The operation of the air balance panel is shown as an example by a pattern during the deceleration of vehicle in FIG. 6.

In the embodiment described in FIG. 5, the brake interlocking switch 27 can operate with priority over the output signal of the control circuit 20. This condition can be fulfilled by adopting well-known means in respect to the configuration of the switch 27, the formation and addition of a supplementary circuit, and the connection between the switch 27 and the control circuit 20. It may be also possible to utilize a valve means instead of the switch 27. FIG. 6 shows the movement of the panel by the circuit shown in FIG. 5. Accordingly, whenever the brake pedal 23 is depressed, the brake interlock switch 27 is operated such that the voltage source V+ is not supplied to the solenoid 16a. Therefore the panel is moved towards the upward position even though the panel is positioned at the lower position because of the speed response voltage EV being beyond the voltage E+.

From the above, it will be seen that according to the present invention the air balance panel can move upwardly and be retracted into the vehicle body 12 in response to the depressing of the brake pedal 23. Therefore, it will be possible to protect the air balance panel in spite of the high speed of the vehicle when the obstacles are discovered on a road.

Obviously those skilled in the art may make various changes in the details and arrangements of parts without departing from the spirit and scope of the invention as defined by the claims hereto appended, and it is therefore desired that the invention be not restricted to the precise construction herein disclosed.

What is claimed is:

1. A movable type air balance panel movably mounted beneath a front end of a vehicle body for improving aerodynamic characteristics of a vehicle, said air balance panel comprising:
   an actuator operatively coupled to said air balance panel to move said air balance panel upwardly and downwardly;
   a switching means connected to said actuator for switching the operation of aid actuator; and
   an electric control circuit means for electrically controlling said switching means;
   connecting means coupled to said control circuit for transmitting an operation signal to said switching means and for maintaining said air balance panel in an operative position when a speed of said vehicle reaches a predetermined speed.

2. A movable type air balance panel according to claim 1, wherein said electric control circuit means comprises comparison circuit receiving as an input signal a vehicle speed responsive signal from a vehicle speed responsive generating means and then comparing said speed responsive signal with a signal corresponding to said predetermined speed.

3. A movable type air balance panel according to claim 2, wherein said speed responsive generating means converts a pulse signal into a voltage signal and, said pulse signal is transmitted from a speed detecting reed switch.

4. A movable type air balance panel according to claim 3, wherein said reed switch is operated by a rotation of a magnet rotating in response to a rotation of a drive shaft and generating a pulse frequency signal corresponding to said vehicle speed.

5. A movable type air balance panel according to claim 1, wherein said actuator includes a chamber defined by a diaphragm connected with said balance panel by way of a link means.

6. A movable type air balance panel according to claim 5, wherein said diaphragm moves upwardly and downwardly in response to a vacuum pressure in said chamber of said actuator.

7. A movable type air balance panel according to claim 5, wherein said switching means comprises a solenoid valve for operating said actuator.

8. A movable type air balance panel according to claim 7, wherein said solenoid valve connects said chamber with an engine intake manifold on an excitation of a solenoid and connects said chamber with an atmosphere on a non-excitation of said solenoid.

9. A movable type air balance panel according to claim 1, wherein said upward and downward movements of said air balance panel are operated with hysteresis.

10. A movable type air balance panel according to claim 9, wherein said operating signal transmitted by said control circuit is generated by a vehicle speed being different from said predetermined speed.

11. A movable type air balance panel movably mounted beneath a front end of a vehicle body for improving aeromechanic characteristics of a vehicle, said air balance panel comprising:
    an actuator causing said air balance panel to move upwardly and downwardly;
    a switching means switching an operation of said actuator; and
    a circuit transmitting an input signal to said switching means in response to a depression on a brake pedal,
    said air balance panel maintained in a nonoperative position when said brake pedal is depressed.

12. A movable type air balance panel according to claim 11 additionally comprising a control circuit transmitting an operation signal to said switching means and maintaining said air balance panel in an operative operative when a vehicle speed reaches a predetermined speed.

13. A movable type air balance panel according to claim 12, wherein said control circuit comprises a comparison circuit receiving a vehicle speed responsive signal from a vehicle speed responsive generating means and then comparing said speed responsive signal with a signal corresponding to said predetermined speed.

14. A movable type air balance panel according to claim 13, wherein said control circuit is connected with said circuit operating said switching means in response to said depression on the brake pedal.

15. A movable type air balance panel according to claim 11, wherein an upward and downward movements of said air balance panel are operated with hysteresis.

16. A movable type air balance panel according to claim 14 further comprising:
    means for maintaining said air balance panel in a rectracted position in response to said brake pedal being depressed irrespective of the operation signal transmitted from said control circuit.

17. A movable type air balance panel movably mounted on a vehicle body for improving aerodynamic characteristics of said vehicle wherein said air balance panel comprises:
    an actuator means operatively coupled to said air balance panel to move said air balance panel in an upward and downward direction such that said air balance panel, normally housed in said vehicle body, is projected from said vehicle body so as to improve the aerodynamic characteristics of said vehicle; and
    an electric control circuit means coupled to said actuator for electrically controlling said actuator so as to project said air balance panel from said vehicle body when a speed of said vehicle reaches a first predetermined speed and to house said air balance panel in said vehicle body when the speed of said vehicle reaches a second predetermined speed below that of said first predetermined speed.

* * * * *

UNITED STATES PATENT AND TRADEMARK OFFICE
CERTIFICATE OF CORRECTION

PATENT NO. : 4558897

DATED : December 17, 1985

INVENTOR(S) : TEIJI OKUYAMA, ET AL

It is certified that error appears in the above-identified patent and that said Letters Patent is hereby corrected as shown below:

In the abstract, line 1, delete "panel is mounted" and insert therefor --panel is movably mounted--;

In column 1, line 15, after "that" delete "a" and insert therefor --the--;

In column 1, line 33, between "art" and "balance" insert --air--;

In column 1, line 37, delete "upward and downward" and insert therefor --upwardly and downwardly--;

UNITED STATES PATENT AND TRADEMARK OFFICE
CERTIFICATE OF CORRECTION

PATENT NO. : 4558897

DATED : December 17, 1985

INVENTOR(S) : TEIJI OKUYAMA, ET AL

It is certified that error appears in the above-identified patent and that said Letters Patent is hereby corrected as shown below:

In column 1, line 53, delete "install" and insert therefor --installed--;

In column 1, line 54, delete "embodiyig" and insert therefor --embodying--;

In column 2, line 26, delete "vaccum" and insert therefor --vacuum--;

In column 2, line 43, delete "supples" and insert therefor --supplies--;

In column 2, line 43, delete "contstant" and insert therefor --constant--;

UNITED STATES PATENT AND TRADEMARK OFFICE
CERTIFICATE OF CORRECTION

PATENT NO. : 4558897

DATED : December 17, 1985

INVENTOR(S) : TEIJI OKUYAMA, ET AL

It is certified that error appears in the above-identified patent and that said Letters Patent is hereby corrected as shown below:

In column 2, line 66, delete "souce" and insert therefor --source--;

In column 4, line 67, delete "thr" and insert therefor --the--;

In column 4, line 67, delete "transister" and insert therefor --transistor--;

In column 4, line 68, delete "transister" and insert therefor --transistor--;

In column 5, line 6, delete "rresponsive" and insert therefor --responsive--;

UNITED STATES PATENT AND TRADEMARK OFFICE
CERTIFICATE OF CORRECTION

PATENT NO. : 4558897

DATED : December 17, 1985

INVENTOR(S) : TEIJI OKUYAMA, ET AL

It is certified that error appears in the above-identified patent and that said Letters Patent is hereby corrected as shown below:

In column 6, line 5, delete "previons" and insert therefor --previous--;

In column 7, line 14, delete "aid" and insert therefor --said--;

In column 7, line 24, between "comprises" and "comparison" insert --a--;

In column 8, line 18, after "operative" delete "operative" and insert therefor --position--.

Signed and Sealed this

Third Day of June 1986

[SEAL]

Attest:

DONALD J. QUIGG

Attesting Officer     Commissioner of Patents and Trademarks